(No Model.)
S. L. NALY & M. S. JONES.
BICYCLE SADDLE.
No. 499,244. Patented June 13, 1893.
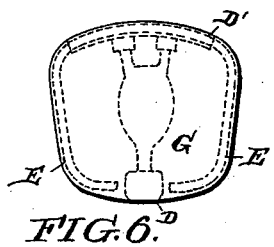
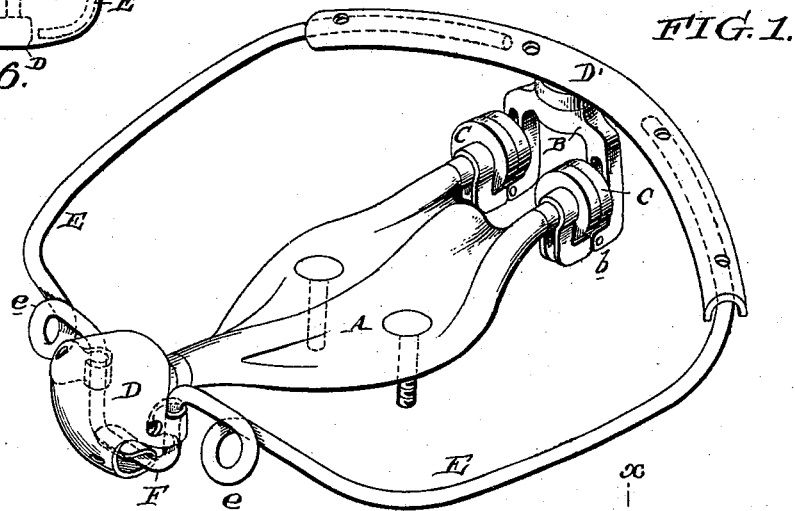
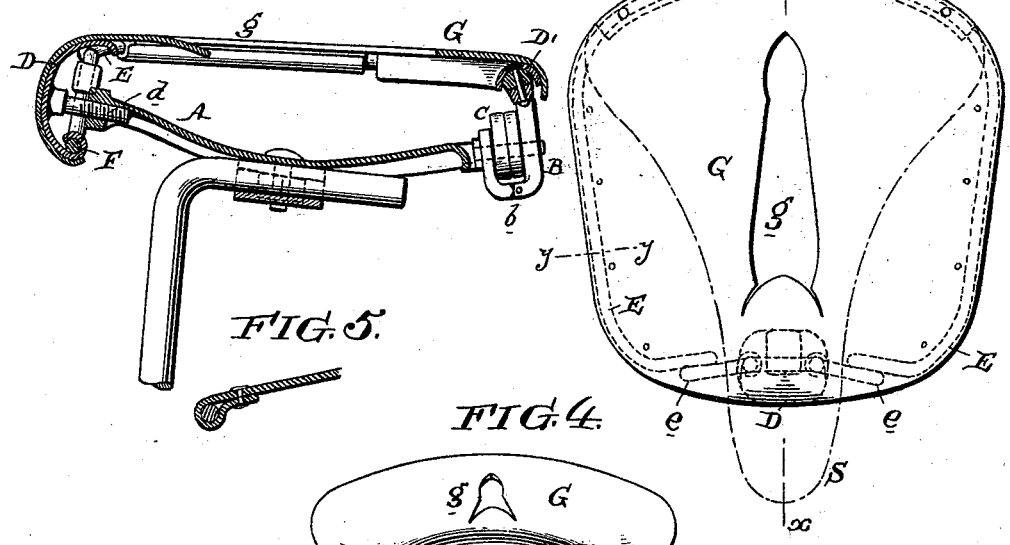
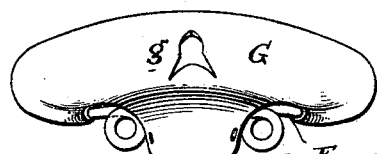
WITNESSES:
INVENTORS:
Sarah L. Naly &
Mary S. Jones

UNITED STATES PATENT OFFICE.

SARAH L. NALY AND MARY SCOTT JONES, OF PHILADELPHIA, PENNSYLVANIA.

BICYCLE-SADDLE.

SPECIFICATION forming part of Letters Patent No. 499,244, dated June 13, 1893.

Application filed November 28, 1892. Serial No. 453,351. (No model.)

*To all whom it may concern:*

Be it known that we, SARAH L. NALY and MARY SCOTT JONES, of the city and county of Philadelphia and State of Pennsylvania, have invented an Improvement in Bicycle-Saddles, of which the following is a specification.

Our invention has reference to bicycle saddles, and consists of certain improvements which are fully set forth in the following specification and shown in the accompanying drawings which form a part thereof.

Our invention is especially adapted to bicycles designed for ladies' use. Heretofore the saddles used on bicycles for male and female riders have been substantially alike, and consisted of a suitable frame or support of metal carrying a leather seat which was made wide at the rear and extending forward in a narrow construction more or less pointed. While such a seat is excellently adapted to male riders, it is obviously not suited to female riders. Aside from being uncomfortable to a female rider, it has the important objection that the point or projection at the forward part catches upon the skirts of the rider when getting on or off the bicycle, often causing considerable mishap, to say nothing of mortification.

The object of our invention is to so shape the saddle that it forms no projecting points or parts upon which the skirts could possibly catch, and furthermore which shall greatly widen the forward part of the saddle upon which the rider sits, and preferably reduce the depth or the distance from front to back. Furthermore, by widening the saddle at the front end, it is possible to form a larger opening in the middle of the saddle which greatly adds to the comfort of the rider and gives more flexibility to that portion.

In carrying out our invention we form a saddle of almost the same width at the front as at the rear, and while the main strain is taken upon the center of the front and the entire width of the back, we provide suitable supports to hold the lateral projections of the forward part of the leather in proper position, while at the same time not forming sufficient obstruction to prevent the free movement of the limbs in working the treadles of the bicycle.

Our invention will be better understood by reference to the accompanying drawings, in which—

Figure 1 is a perpective view of the saddle frame with the leather removed. Fig. 2 is a plan view of the complete saddle. Fig. 3 is a sectional elevation of Fig. 2 on line $x$—$x$. Fig. 4 is a front elevation of the saddle. Fig. 5 is a cross section on line $y$—$y$ of Fig. 2; and Fig. 6 is a plan view of our improved saddle showing a modification thereof.

A is the main frame for attachment to the supporting rod extending from the bicycle. The forward part of this frame A receives the screw threaded stem of a curved head D to which the forward part of the leather is attached by rivets. This head may be adjusted by means of the screw thread. The rear part of the frame A is provided with a pivoted head B hinged to the frame A at $b$ and received against rubber springs C which are interposed between the frame A and head B. The head B is also provided at its upper part with a wide inverted U shaped frame D' upon which the leather of the saddle is secured by rivets at the rear.

G is the saddle leather and is stretched between the parts D' and D.

The dotted lines at S in Fig. 2 indicate the former shape of this saddle and will also show the decided change which has been made in the configuration.

The lateral projections at the forward end of the leather G forming the seat portion of the saddle are sustained by springs E, E, which are preferably made continuous with one or more coils $e$ for elasticity, and may be secured in the head D as indicated in the several figures. The rear ends of the springs E may be loose or free, and if desired may extend within the ends of the frame D', as shown in Fig. 1, or under the leather in front thereof. If desired, the springs E may be secured to the frame D' and have their free ends projecting forward toward the head D as indicated in Fig. 6. The edges of the leather of the seat G are passed over these springs E and secured thereto as indicated in Fig. 5, so that the springs sustain the edges of the seat sufficiently to hold them always in proper position, and yet permit the movement of the limbs in working the treadles and offer no serious obstruction.

By making the forward part of the seat wide as indicated in Fig. 2, it is evident that the opening *g* in the center of the seat may be made greatly larger than was heretofore possible with narrow sides, and the increase in this opening makes the seat far more comfortable to female riders, since it gives more flexibility to the seat.

We do not confine ourselves to any particular construction of metal work, as it is evident that our improved seat may be adapted to the metal work of any of the bicycles at present in the market, our invention being more especially directed to the change in the shape of the seat with the proper means of supporting the free or lateral edges at the forward part.

What we claim as new, and desire to secure by Letters Patent, is—

1. A bicycle seat consisting of a frame work for supporting the front and rear of the leather portion of the seat, in combination with a leather seat secured to said frame work having the forward part of a width approximating that at the rear, and of a substantially uniform width throughout its length and flexible supports for the free edges of the lateral extensions of the seat at the forward part.

2. A bicycle seat consisting of a frame work for supporting the front and rear of the leather portion of the seat, in combination with a leather seat secured to said frame work having the forward part of a width approximating that at the rear, and of a substantially uniform width throughout its length and flexible supports for the free edges of the lateral extensions of the seat at the forward part consisting of springs having one end free and the other end secured to the frame work.

3. In a bicycle seat for female riders, the combination of a frame of metal having a wide support for the seat proper at the rear and a narrow support for the forward part, in combination with a leather or flexible seat covering secured to said frame and having its forward part laterally projected so as to approximate the width at the rear, and flexible supports for said lateral projections of the seat for sustaining them with freedom of vertical movement under the action of the limbs of the rider.

4. In a bicycle seat for female riders, the combination of a frame of metal having a wide support for the seat proper at the rear and a narrow support for the forward part, with a leather or flexible seat covering secured to said frame and having its forward part laterally projected so as to approximate the width at the rear, and flexible supports for said lateral projections consisting of springs secured at the forward part to the frame and having the rear ends free.

In testimony of which invention we have hereunto set our hands.

SARAH L. NALY.
MARY SCOTT JONES.

Witnesses:
R. M. HUNTER,
H. L. MOTHERWELL.